(12) United States Patent
Mazzaro et al.

(10) Patent No.: US 12,258,697 B2
(45) Date of Patent: Mar. 25, 2025

(54) GASKET FOR WASHING MACHINES AND WASHING MACHINE INCLUDING THIS GASKET

(71) Applicant: INDUSTRIE ILPEA S.P.A., Malgesso (IT)

(72) Inventors: Sandro Mazzaro, San Vito al Tagliamento (IT); Paolo Cittadini, Luvinate (IT)

(73) Assignee: INDUSTRIE ILPEA S.P.A., Malgesso (IT)

( * ) Notice: Subject to any disclaimer, the term of this patent is extended or adjusted under 35 U.S.C. 154(b) by 0 days.

(21) Appl. No.: 18/006,913

(22) PCT Filed: Jul. 26, 2021

(86) PCT No.: PCT/IB2021/056699
§ 371 (c)(1),
(2) Date: Jan. 26, 2023

(87) PCT Pub. No.: WO2022/023917
PCT Pub. Date: Feb. 3, 2022

(65) Prior Publication Data
US 2023/0272570 A1    Aug. 31, 2023

(30) Foreign Application Priority Data

Jul. 27, 2020    (IT) .................. 102020000018133

(51) Int. Cl.
*D06F 37/26*    (2006.01)
*D06F 34/20*    (2020.01)
(Continued)

(52) U.S. Cl.
CPC ............ *D06F 37/266* (2013.01); *D06F 34/20* (2020.02); *D06F 39/14* (2013.01); *F16J 15/0818* (2013.01);
(Continued)

(58) Field of Classification Search
CPC ..... F16J 15/0818; D06F 37/266; D06F 34/20; D06F 39/14; D06F 2105/58; D06F 2105/62; D06F 2103/40
See application file for complete search history.

(56) References Cited

U.S. PATENT DOCUMENTS

| | | |
|---|---|---|
| 5,838,125 A | 11/1998 | Choi |
| 2014/0225332 A1* | 8/2014 | Baart ................... F16J 15/3264 |
| | | 277/549 |
| 2018/0274682 A1* | 9/2018 | Shimizu ............... F16J 15/3296 |

FOREIGN PATENT DOCUMENTS

| | | |
|---|---|---|
| DE | 102016225200 B3 | 4/2018 |
| DE | 102016225201 A1 | 6/2018 |
| WO | 2012068646 A1 | 5/2012 |

OTHER PUBLICATIONS

International Search Report and Written Opinion in corresponding International Patent Application No. PCT/IB2021/056699 mailed Oct. 7, 2021. 12 pages.

* cited by examiner

*Primary Examiner* — Eugene G Byrd
*Assistant Examiner* — L. Susmitha Koneru
(74) *Attorney, Agent, or Firm* — Leason Ellis LLP

(57) ABSTRACT

Gasket (1) for washing machines (9), which comprises at least one annular body (2) of deformable material and is provided with at least one first perimetric lip (3), wherein the gasket (1) comprises at least one perimetric canal (6) which extends at least partially along the annular body (2) and is adapted to house at least partially an elongated sensor (12). The present description also relates to a washing machine (9) in which said gasket (1) is applied around an access opening (8) of the drum of the washing machine (9), which is provided with a door (10) suitable for closing this access (Continued)

opening (8). The present description also relates to a method for controlling this washing machine (9).

22 Claims, 1 Drawing Sheet

(51) Int. Cl.
*D06F 39/14* (2006.01)
*F16J 15/08* (2006.01)
*D06F 103/40* (2020.01)
*D06F 105/58* (2020.01)
*D06F 105/62* (2020.01)

(52) U.S. Cl.
CPC ...... *D06F 2103/40* (2020.02); *D06F 2105/58* (2020.02); *D06F 2105/62* (2020.02)

GASKET FOR WASHING MACHINES AND WASHING MACHINE INCLUDING THIS GASKET

CROSS-REFERENCE TO RELATED PATENT APPLICATIONS

This application is a U.S. National Stage Application under 35 U.S.C. § 371 of International Patent Application No. PCT/IB2021/056699 filed Jul. 26, 2021, which claims the benefit of priority of Italian Patent Application No. 102020000018133 filed Jul. 27, 2020, both of which are incorporated by reference in their entireties. The International Application was published on Feb. 2, 2022, as International Publication No. WO 2022/023917 A1.

TECHNICAL FIELD

The present description relates to a gasket for washing machines which can be applied around the access opening of a drum of a washing machine. The present description also relates to a washing machine comprising this gasket and a method for controlling this washing machine.
Background the Description The presence of a foreign body, in particular a garment, between the access opening of the drum of a washing machine and the door which closes this opening may cause damage to both the foreign body and the gasket around the opening, if the washing machine is started.

Some known washing machines comprise a control system which can detect the presence of foreign bodies by measuring the torque exerted by the motor which drives the drum. This known control system cannot detect or detect too late the presence of thin foreign bodies, so as not to prevent the above drawbacks, and also may accidentally stop the washing machine even when the torque exerted by the motor is excessive for other reasons.

U.S. Pat. No. 5,838,125 A describes a control system which detects the presence of foreign bodies by verifying the absorption of a motor which automatically closes the door. However, also this known control system has a low sensitivity and furthermore it can be applied only to the washing machines with a motorized door.

SUMMARY OF THE DESCRIPTION

Object of the present description is therefore to provide a washing machine free from said drawbacks. Said object is achieved with a gasket, a washing machine and a method, the main characteristics of which are specified in the attached claims, to be considered an integral part of the present description.

Thanks to its particular perimetric canal, the gasket according to the present description allows housing at least partially a sensor for detecting in a relatively precise and economical way the presence of foreign bodies between the door and the access opening of a washing machine.

Preferably, this perimetric canal has a substantially elliptical section and/or is closed and connected to the outside through at least one passage, in particular a slot which extends in a substantially axial direction towards a rear side of the gasket, so that the sensor can be easily inserted and stably housed in the perimetric canal without compromising the seal of the gasket.

Preferably, this perimetric canal is arranged at a front side of the gasket, along or beside at least one front wall thereof, so as to improve the sensitivity of the sensor arranged therein.

Preferably, the sensor comprises one or more conductors arranged in an elongated element of deformable and insulating material, in particular with at least one longitudinal cavity arranged between the conductors, so as to be able to detect even minimal deformations of the gasket by means of a capacitive sensor.

Preferably, the door of the washing machine comprises at least one perimetric relief facing the gasket when the door is closed, so as to further improve the sensitivity of the sensor and to be able to immediately stop the operation of the washing machine when the door is closed by means of an electric lock.

BRIEF DESCRIPTION OF THE DRAWINGS

Further advantages and features of the gasket and of the washing machine according to the present description will become apparent to those skilled in the art from the following detailed description of some embodiments, to be considered non-limiting examples of the claims, with reference to the accompanying drawings in which:

EXEMPLARY EMBODIMENTS

Figure 1:
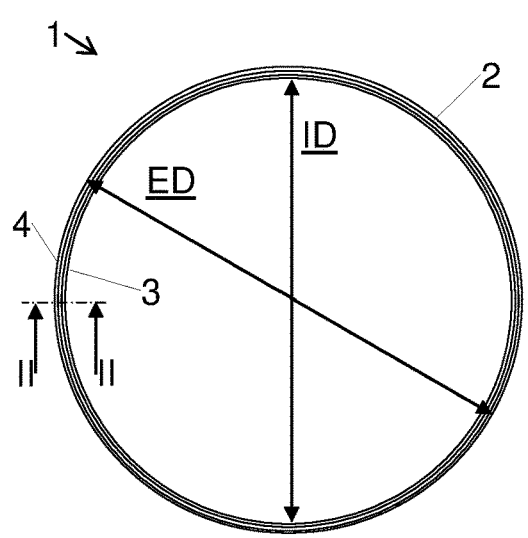
FIG. 1 shows a front view of the gasket.
Figure 2:
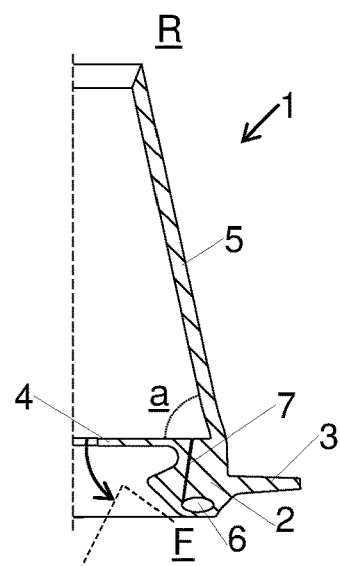
FIG. 2 shows the enlarged section II-II of FIG. 1.

FIGS. 1 and 2 show the gasket 1 for washing machines according to the present description, which comprises at least one annular body 2 of deformable material, in particular impermeable to liquids. The inner diameter ID and/or the external diameter ED of the gasket 1 are preferably between 15 and 40 cm. The gasket 1 can be provided with at least one first perimetric lip 3, in particular oriented in a substantially radial direction towards the inside of the annular body 2, to provide a seal between an access opening to the drum of a washing machine and a door adapted to close this opening.

The gasket 1 can also be provided with one or more further perimetric lips 4, 5 adapted to be arranged around the access opening of the washing machine. For this purpose, a second lip perimetric 4 protrudes in a substantially radial direction towards the outside of the annular body 2 and forms an angle a, in particular between 70° and 89°, with a third perimetric lip 5 projecting in a substantially axial direction from the annular body 2. The third perimetric lip 5 is not visible in FIG. 1 since it protrudes towards a rear side R of the gasket 1, that is the side of the gasket 1 which will be facing the washing machine.

The first perimetric lip 3 and/or the second perimetric lip 4 and/or the third perimetric lip 5 are preferably made of a single piece of elastomeric material with the annular body 2.

The gasket 1 comprises at least one perimetric canal 6, in particular having a substantially elliptical section, which extends at least partially, in particular completely, along the annular body 2. The perimetric canal 6 is preferably closed and connected to the outside of the gasket 1 through at least one passage 7, in particular a perimetric slot which extends in a substantially axial direction towards the rear side R of the gasket 1 and/or has a substantially rectilinear section. The passage 7 can lead to the outside of the annular body 2 between the second perimetric lip 4 and the third perimetric lip 5. The perimetric canal 6 is preferably arranged at a front side F of the gasket 1, along or beside at least one front wall 2*a* thereof, preferably at a distance not greater than 5 mm. The gasket 1 can be deformed by bending the second perimetric lip 4 towards the front side F in the direction of the arrow in FIG. 2, to widen the passage 7 (as shown by the dotted line) and facilitate the insertion of elements into the perimetric canal 6.

Figure 3:
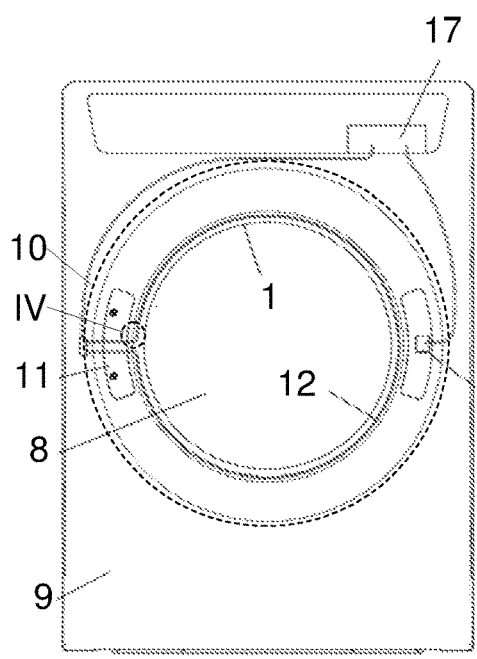
FIG. 3 shows a front view of the washing machine with the gasket of FIG. 1.
Figure 4:
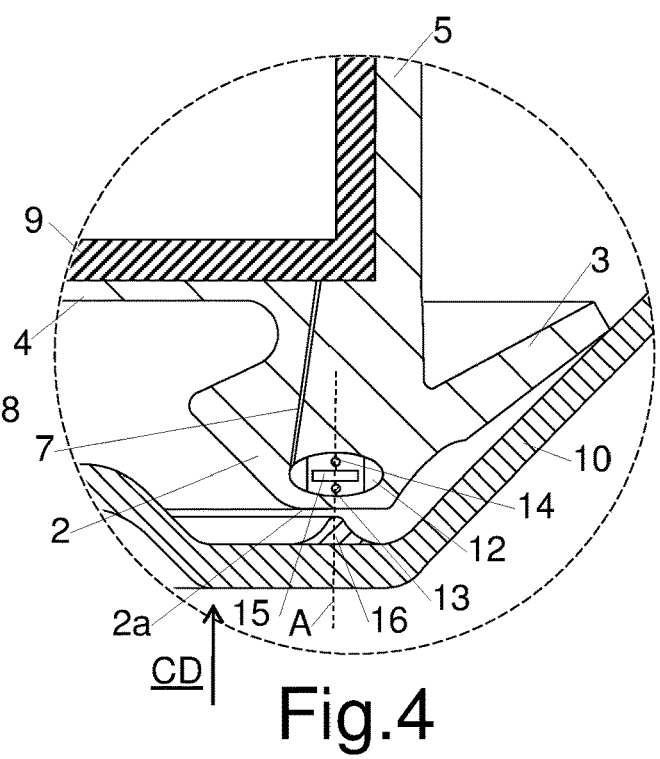
FIG. 4 shows an enlarged sectional view of detail IV of FIG. 3.
Figure 5:
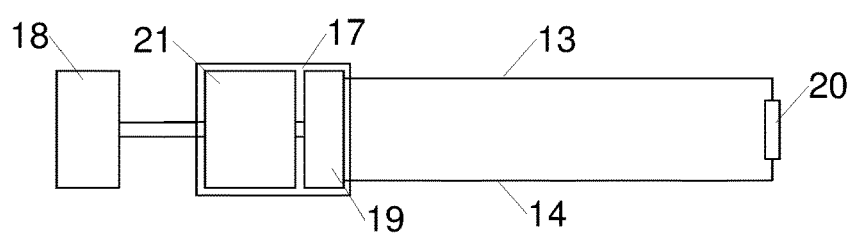
FIG. 5 shows an electrical diagram of the control system of the washing machine.

FIGS. 3 and 4 show the gasket 1 applied around an access opening 8 of the drum of a washing machine 9 provided with a door 10 (shown with a dashed line in FIG. 3) adapted to close this opening access 8, for example by rotating the door 10 by means of a hinge 11 fixed between the washing machine 9 and the door 10. The second perimetric lip 4 and/or the third perimetric lip 5 are slightly spread apart during the application of the gasket 1, so as to increase the angle a between them and allow a perfect adherence to a corner of an element of the washing machine 9. When the door 10 is closed, the first perimetric lip 3 is bent by the door 10, so as to urge against it and create a seal to liquids between the gasket 1 and the door 10.

A sensor 12 is housed at least partially, in particular completely, in the perimetric canal 6, and is preferably inserted into the perimetric canal 6 through the passage 7 before the gasket 1 is applied to the washing machine 9. The sensor 12 has an elongated shape and extends at least along most of the perimetric canal 6, going into and/or out of the gasket 1 preferably near the hinge 11.

In particular, the sensor 12 comprises one or more conductors 13, 14 arranged in an elongated element of deformable and insulating material, in particular plastic or synthetic rubber. The sensor 12 can have a substantially elliptical section and/or comprise at least one longitudinal cavity 15 arranged between the conductors 13, 14. The door 10 preferably comprises at least one perimetric relief 16 which faces the gasket 1 when the door 10 is closed, so that if a foreign body is arranged between the gasket 1 and the door 10, in particular the perimetric relief 16, the gasket 1 and the sensor 12 are deformed by the foreign body, thus varying the position of the conductors 13, 14 and/or their mutual distance. Preferably, the conductors 13, 14 and/or the perimetric relief 16 are substantially arranged along an axis A substantially parallel to the closing direction CD of the door 10, while the major axes of the section of the sensor 12 and/or of the section of the longitudinal cavity 15 are substantially perpendicular to this closing direction CD, namely to the axis A.

The conductors 13, 14 of the sensor 12 are preferably connected to a control system 17 of the washing machine 9 which is in turn connected also to an electric lock 18 adapted to lock or unlock the door 10 when it is closed. The control system 17 can comprise or be connected to at least one capacitive sensor 19 which can measure at least the capacitance between the conductors 13, 14, which are connected together in series through at least one resistive element 20. The capacitive sensor 19 can also measure variations in the resistance between the conductors 13, 14 if these come into contact with each other.

The control system 17 preferably comprises an electronic control unit 21 adapted to control the electric and electronic components of the washing machine 9, in particular to control the electric lock 18 according to the signals transmitted by the capacitive sensor 19.

In the method according to the present description, the control system 17 prevents the washing machine 9 from starting and/or emits an alarm signal if it detects that the electric lock 18 is closed and the capacitive sensor 19 detects a variation in the nominal capacity between the conductors 13, 14, namely the sensor 12 detects the presence of a foreign body between the gasket 1 and the door 10.

Variants or additions may be made by those skilled in the art to the embodiments described and shown herein, while remaining within the scope of the following claims. In particular, further embodiments can comprise the technical features of one of the following claims with the addition of one or more technical features described in the text or illustrated in the drawings, taken individually or in any mutual combination.

The invention claimed is:

1. A gasket for washing machines, which comprises at least one annular body of deformable material and is provided with at least one first perimetric lip, wherein the gasket comprises at least one perimetric canal which extends at least partially along the annular body and is adapted to house at least partially a sensor with an elongated shape, wherein the perimetric canal is closed and connected to the outside of the gasket through at least one passage.

2. The gasket according to claim 1, wherein the perimetric canal has a substantially elliptical section.

3. The gasket according to claim 1, wherein said passage is a perimetric slot which extends in a substantially axial direction towards a rear side of the gasket and/or has a substantially rectilinear section.

4. The gasket according to claim 1, wherein the perimetric canal is arranged at a front side of the gasket, along or beside at least one front wall thereof.

5. The gasket according to claim 1, wherein a sensor with an elongated shape is arranged in the perimetric canal and extends at least along most of the perimetric canal.

6. The gasket according to claim 5, wherein the sensor comprises one or more conductors arranged in an elongated element of deformable and insulating material.

7. The gasket according to claim 6, wherein at least one longitudinal cavity is arranged between the conductors.

8. A washing machine comprising a gasket according to claim 1, wherein the gasket is applied around an access opening of a drum of the washing machine, which is provided with a door adapted to close this access opening.

9. The washing machine according to claim 8, wherein a sensor with an elongated shape is arranged in the perimetric canal of the gasket and extends at least along most of the perimetric canal, wherein the sensor is connected to a control system, in turn connected to at least one electric lock of the door.

10. The washing machine according to claim 8, wherein the door comprises at least one perimetric relief which faces the gasket when the door is closed.

11. The washing machine according to claim 9, wherein the control system comprises or is connected to at least one capacitive sensor suitable for measuring the capacity between conductors of the sensor.

12. The washing machine according to claim 11, wherein the conductors are substantially arranged along an axis substantially parallel to the closing direction of the door.

13. A method for controlling the washing machine according to claim 9, wherein the control system prevents the start of the washing machine and/or emits an alarm signal if it detects that the electric lock is closed and the sensor detects the presence of a foreign body between the gasket and the door.

14. The washing machine according to claim 10, wherein the perimetric relief is substantially arranged along an axis substantially parallel to the closing direction of the door.

15. A washing machine comprising a gasket according to claim 5, wherein the gasket is applied around an access opening of a drum of the washing machine, which is provided with a door adapted to close this access opening.

16. The washing machine according to claim 15, wherein the door comprises at least one perimetric relief which faces the gasket when the door is closed.

17. The washing machine according to claim 16, wherein the perimetric relief is substantially arranged along an axis substantially parallel to the closing direction of the door.

18. The washing machine according to claim 15, wherein the sensor of the gasket is connected to a control system, in turn connected to at least one electric lock of the door.

19. The washing machine according to claim 18, wherein the control system comprises or is connected to at least one capacitive sensor suitable for measuring the capacity between conductors of the sensor.

20. The washing machine according to claim 19, wherein the conductors are substantially arranged along an axis substantially parallel to the closing direction of the door.

21. A method for controlling the washing machine according to claim 18, wherein the control system prevents the start of the washing machine and/or emits an alarm signal if it detects that the electric lock is closed and the sensor of the gasket detects the presence of a foreign body between the gasket and the door.

22. A gasket for washing machines, which comprises at least one annular body of deformable material and is provided with at least one first perimetric lip, wherein the gasket comprises at least one perimetric canal which extends at least partially along the annular body and is adapted to house at least partially a sensor with an elongated shape, wherein a sensor with an elongated shape is arranged in the perimetric canal and extends at least along most of the perimetric canal, wherein the sensor comprises one or more conductors arranged in an elongated element of deformable and insulating material, and wherein at least one longitudinal cavity is arranged between the conductors.

* * * * *